United States Patent
Yearsley et al.

(10) Patent No.: US 10,883,428 B2
(45) Date of Patent: Jan. 5, 2021

(54) DUAL FUEL NOZZLE ARRANGEMENT

(71) Applicant: DELPHI TECHNOLOGIES IP LIMITED, St. Michael (BB)

(72) Inventors: Jason Yearsley, Bristol (GB); George A. Meek, Aylburton (GB)

(73) Assignee: DELPHI TECHNOLOGIES IP LIMITED

( * ) Notice: Subject to any disclaimer, the term of this patent is extended or adjusted under 35 U.S.C. 154(b) by 0 days.

(21) Appl. No.: 16/335,980

(22) PCT Filed: Sep. 15, 2017

(86) PCT No.: PCT/EP2017/073340
§ 371 (c)(1),
(2) Date: Mar. 22, 2019

(87) PCT Pub. No.: WO2018/054788
PCT Pub. Date: Mar. 29, 2018

(65) Prior Publication Data
US 2020/0018246 A1  Jan. 16, 2020

(30) Foreign Application Priority Data
Sep. 22, 2016 (GB) .................. 1616132.5

(51) Int. Cl.
*F02D 19/06* (2006.01)
*F02M 43/04* (2006.01)

(52) U.S. Cl.
CPC ..... *F02D 19/0647* (2013.01); *F02D 19/0642* (2013.01); *F02D 19/0689* (2013.01); *F02D 19/0694* (2013.01); *F02M 43/04* (2013.01); *F02M 2200/16* (2013.01); *F02M 2200/46* (2013.01); *F02M 2547/001* (2013.01)

(58) Field of Classification Search
CPC ............ F02D 19/0647; F02D 19/0689; F02D 19/0694; F02D 19/0642; F02D 19/06; F02M 43/04; F02M 2200/16; F02M 2200/46; F02M 2547/001
See application file for complete search history.

(56) References Cited

U.S. PATENT DOCUMENTS

| | | | |
|---|---|---|---|
| 4,834,055 A | 5/1989 | Steiger | |
| 2013/0160741 A1 | 6/2013 | Sommars et al. | |
| 2014/0061326 A1* | 3/2014 | Coldren | F02M 43/04 239/5 |
| 2014/0123937 A1 | 5/2014 | Wickstone et al. | |

FOREIGN PATENT DOCUMENTS

| | | |
|---|---|---|
| DE | 102015209134 A1 | 11/2016 |
| JP | 07243355 A | 9/1995 |
| JP | 11030164 A | 2/1999 |
| JP | 2006183468 A | 7/2006 |
| WO | 2016173826 A1 | 11/2016 |

* cited by examiner

*Primary Examiner* — Jacob M Amick
(74) *Attorney, Agent, or Firm* — Joshua M. Haines

(57) ABSTRACT

A nozzle assembly of a dual fuel injector includes a first fuel conduit and a second fuel conduit. An anti-leakage feature of the nozzle assembly includes a cylindrical tubular sleeve axially extending in an inner space of the nozzle body from an upper end attached to the body to a distant lower end, the outer valve member being axially guided through said sleeve.

10 Claims, 4 Drawing Sheets

DUAL FUEL NOZZLE ARRANGEMENT

CROSS REFERENCE TO RELATED APPLICATIONS

This application is a national stage application under 35 USC 371 of PCT Application No. PCT/EP2017/073340 having an international filing date of Sep. 15, 2017, which is designated in the United States and which claimed the benefit of GB Patent Application No. 1616132.5 filed on Sep. 22, 2016, the entire disclosures of each are hereby incorporated by reference in their entirety.

TECHNICAL FIELD

The present invention relates to a nozzle assembly of a dual fuel injector and more particularly to an anti-leakage device arranged therein.

BACKGROUND OF THE INVENTION

Nozzle of dual fuel injectors have an inner needle sliding in an outer valve member, itself sliding in the body of the nozzle. The body is provided with a bore that is an upper guiding bore for said outer needle.

A first fuel such as pressurized diesel or gasoline, entering the nozzle via an inlet arranged in the body flows through a channel that opens in said guiding bore then continues through another channel inside the outer valve member to finally flow around the inner needle. Under the influence of the pressurized first fuel, the functional clearance between the guiding bore and said outer valve member tends to open enabling fuel leaks.

A second fuel such as compressed gas, entering the nozzle via another inlet arranged in the body flows through another channel that opens in an inner space below said upper guiding bore.

A problem occurs as the first fuel tends to leak and mix with the second fuel in said inner space through fluid transfer down the said guiding bore.

SUMMARY OF THE INVENTION

Accordingly, it is an object of the present invention to resolve the above mentioned problems in providing a nozzle assembly of a dual fuel injector of an internal combustion engine, said nozzle assembly extending along a main axis from a large upper end adapted to cooperate with an actuation member of the injector to a narrow tip end. The nozzle assembly comprises coaxially arranged along said main axis an elongated body having a peripheral wall surrounding an inner space which portion proximal the upper end defines an upper guiding bore for axially guiding an outer valve member arranged therein, said outer valve member being itself provided with a axial bore in which is axially guided an inner valve member and wherein the nozzle assembly further comprises a first fuel conduit comprising said axial bore and extending from an inlet arranged in the large upper end face of the body to a first set of injection holes arranged in the narrow tip end of the outer valve member and, a second fuel conduit comprising said inner space and extending from another inlet arranged in the large upper end face of the body to a second set of injection holes arranged in the narrow tip end of the body.

In use, a first fuel, such as pressurized diesel or gasoline, flows inside the outer valve member and, a second fuel, such as a compressed gas fills and flows in the inner space surrounding said outer valve member.

Moreover, the nozzle assembly is provided with an anti-leakage feature comprising a cylindrical tubular sleeve axially extending in said inner space from an upper end attached to the body, to a distant lower end, the outer valve member being axially guided through said sleeve.

Also, the sleeve is arranged as an extension of the upper guiding bore and a clearance is defined between the outer valve member and the bore, or the sleeve.

In an alternative, the inner diameter of the sleeve is identical to the inner diameter of the upper guiding bore.

In another alternative, the inner diameter of the sleeve is smaller than the inner diameter of the upper guiding bore.

Also, said clearance may be constant or not constant, the sleeve or the outer valve member being provided, on this later case, on at least a part of the length with a taper, so that the clearance changes by less than 10 µm.

In the case the clearance is not constant, the bore or the outer valve member is provided on at least part of its length with a taper, so that the clearance changes by less than 10 µm.

Also, the sleeve is integral to the body.

In another alternative, the sleeve is a separate member non-integral and fixed to the body.

Furthermore, the body comprises an upper member and a tip member, the upper guiding bore being defined in the upper member, the tubular sleeve extending from said upper member.

In this case, the upper member axially extends from an upper transverse face wherein are defined the inlets to a transverse under face complementary receiving the tip member, the tubular sleeve extending from said transverse under face.

Also, the axial length of the sleeve extends in the inner space is approximately eight times the radial thickness of the tubular wall of the sleeve.

The invention further extends to a dual fuel injector comprising a nozzle assembly as set in any one of the preceding claims.

BRIEF DESCRIPTION OF THE DRAWINGS

The present invention is now described by way of example with reference to the accompanying drawings in which.

DESCRIPTION OF THE PREFERRED EMBODIMENTS

Figure 1:
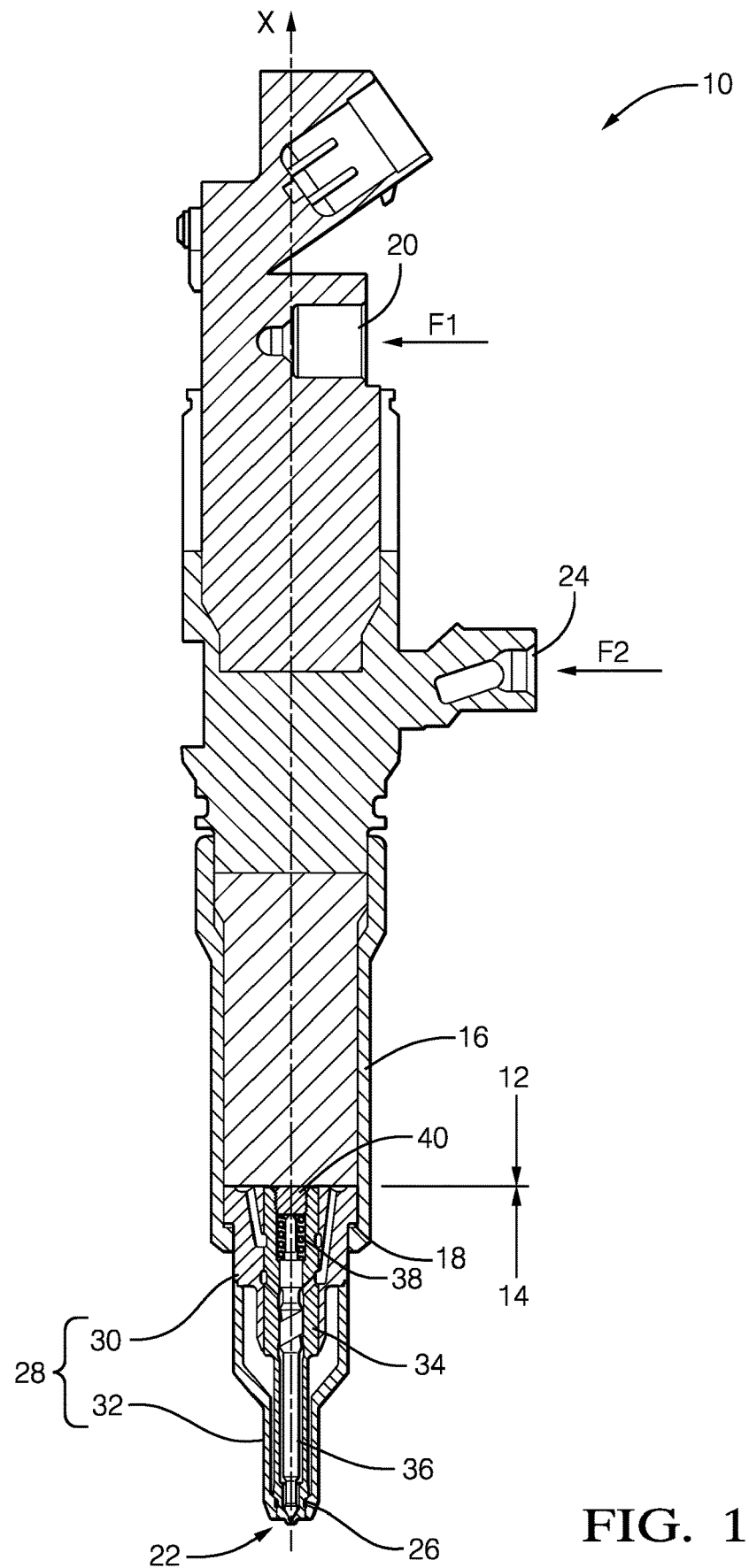
FIG. 1 is an axial section of a dual fuel injector provided with a nozzle arrangement as per the invention.

In reference to FIG. 1 is described a dual fuel injector 10 adapted to inject in a compression chamber of an internal combustion engine a first fuel F1, such as pressurized diesel or gasoline and, a second fuel F2 such as compressed gas. The injector 10 has an elongated shape extending along a main axis X, and it comprises an actuation assembly 12, not described in detail and represented on the top of the figure, that cooperates with a nozzle assembly 14, on the bottom of FIG. 1. Said two assemblies 12, 14 are firmly maintained together by a capnut 16 engaged around the nozzle 14 and bearing on an annular shoulder face 18 of the nozzle and, firmly screwed on the actuation assembly 12. The arbitrary orientation of the figure is utilized simply to ease and clarify the present description. Words such as "upper, under, top, above or below . . . " may be used without any limiting intention.

The injector 10 is provided with a first injection circuit enabling the first fuel F1 to flow from a first inlet 20 arranged in the actuation assembly to a first set of injection holes 22 arranged at the bottom end of the nozzle assembly 14 and, with a second injection circuit for the second fuel F2 to flow from a second inlet 24 also arranged in the actuation assembly to a second set of injection holes 26 arranged at the bottom end of the nozzle assembly 14.

Figure 2:
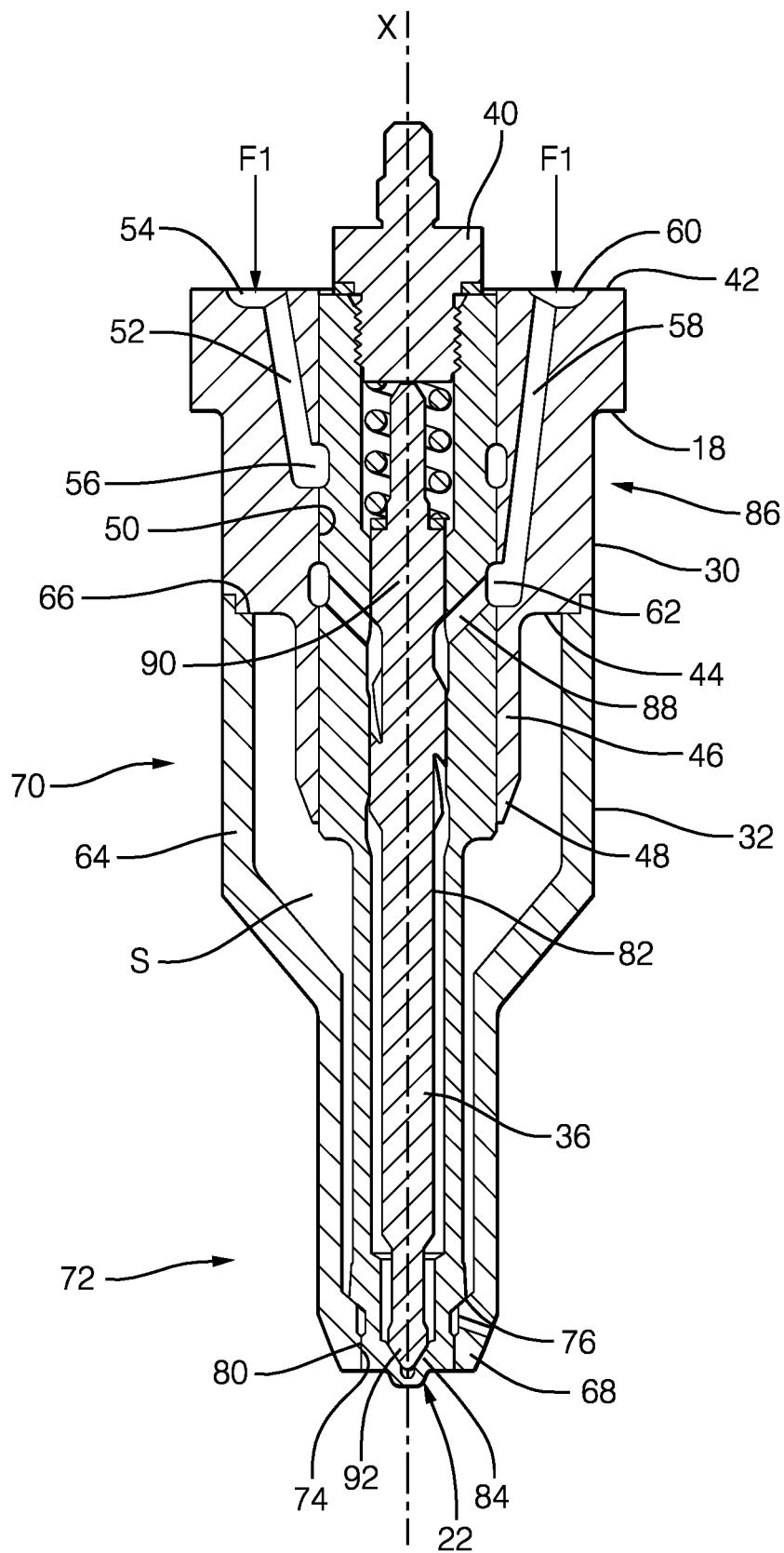
FIG. 2 is an axial section of the nozzle arrangement shown in FIG. 1.
Figure 3:
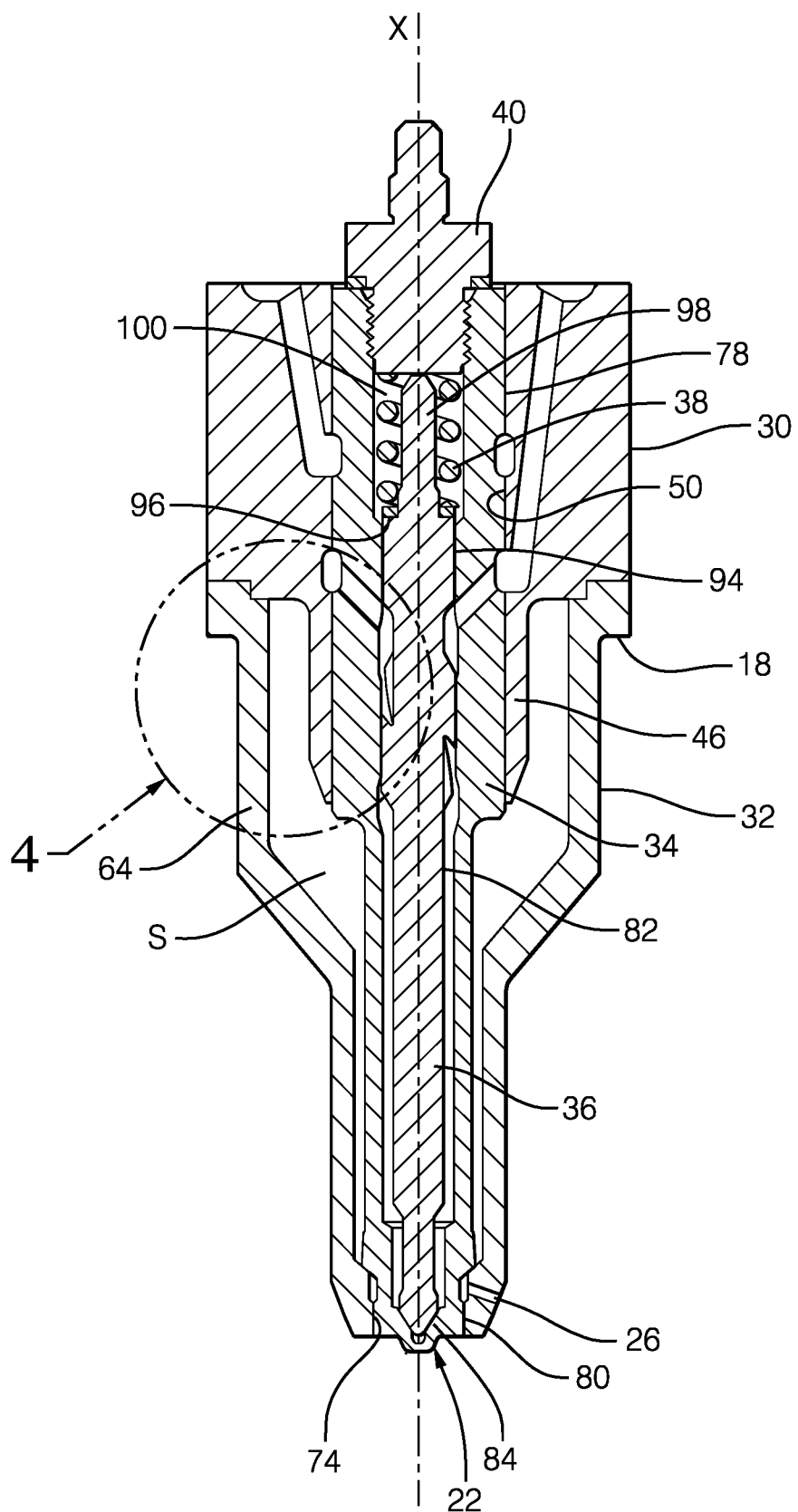
FIG. 3 is an alternative arrangement of the nozzle of FIG. 1.
Figure 4:
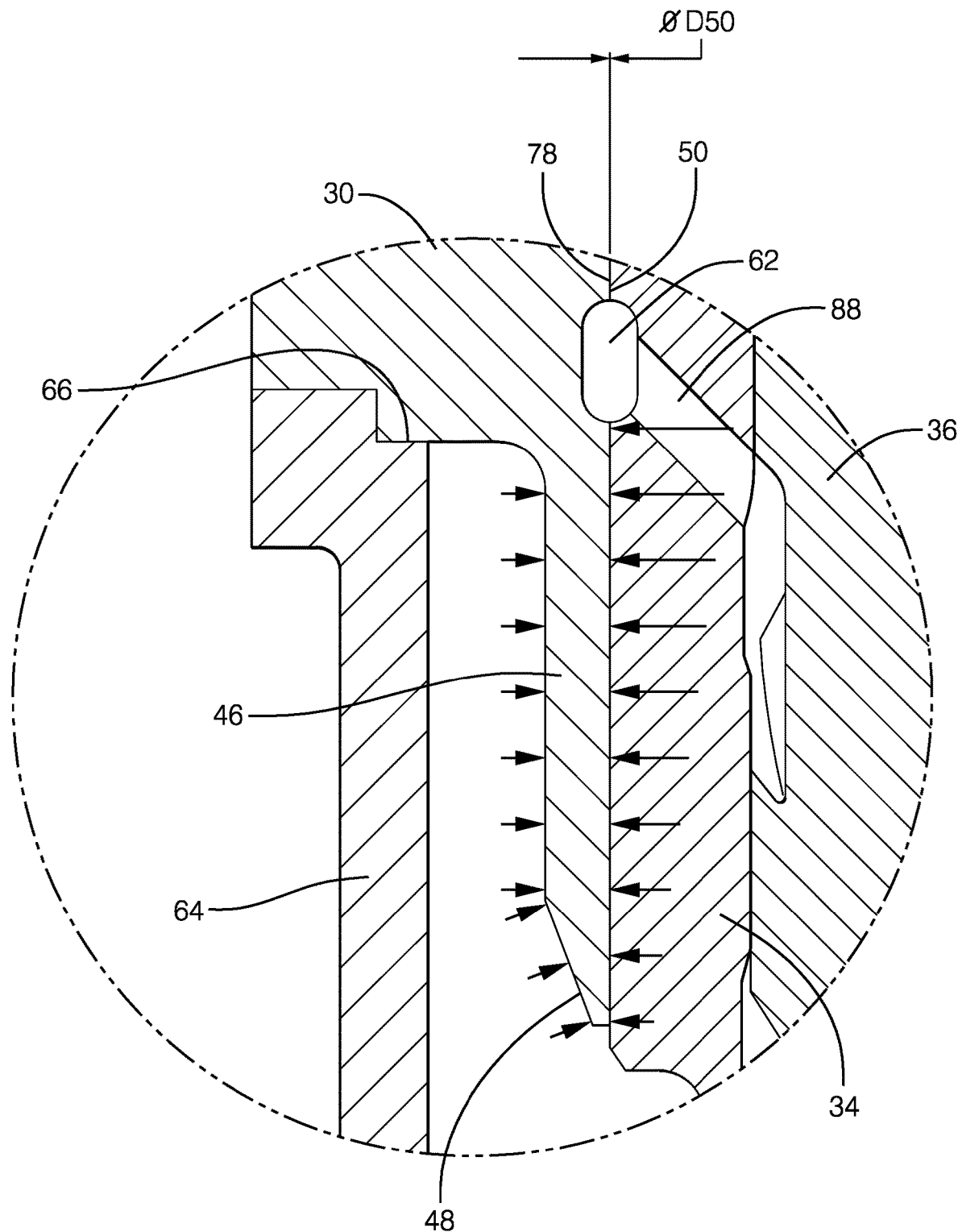
FIG. 4 is a magnified detail of an anti-leakage feature provided on the nozzle of either preceding figure.

The nozzle assembly 14, now detailed in reference to FIGS. 2, 3 and 4, comprises a body 28 having an upper member 30 and a tip member 32, an outer valve member 34, an inner valve member 36, a spring 38 and a plug 40.

In a first embodiment presented on FIG. 2 the shoulder face 18 on which bears the capnut 16 is on the outer peripheral face of the upper member 30 of the body. Consequently, the tip member 32 is fixed to the upper member 30, for instance by welding. In the second embodiment presented on FIG. 3, said shoulder face 18 is arranged on the outer face of the tip member 32 therefore, when the capnut 16 is tightened the upper member 30 is compressed between the tip member 32 and the actuation assembly 12 and no specific fixation means is required to maintain the upper member 30 in place. In both embodiments dowels, not represented, ensure correct orientation and angular positioning of the nozzle assembly with the actuation assembly 12.

The upper member 30 is a cylinder and it extends from a transverse upper face 42 to an under face 44 from which centrally and axially protrudes an integral sleeve member 46 downwardly extending toward a distant extremity 48. Said upper member 30 is also provided with an axial X through bore 50 opening in said upper face 42 and extending through the sleeve 46 opening in said distant extremity 48, either keeping throughout its length a constant diameter D50 or, having a slight taper. In case of a taper, the taper can be limited to the sleeve area or could extend throughout the bore 50 from the upper face 42 down to the extremity 48 of the sleeve. The difference in diameters between the two ends of taper area could be around 10 μm, preferably less than 10 μm. This taper can be oriented either direction along the axis, creating a clearance increasing or narrowing as approaching the distant extremity 48. Furthermore, the taper can be created all along the length either of the sleeve or the complete bore 50 or, only on part of it, the other part being cylindrical. Such clearance can also be created with a cylindrical sleeve and a tapered outer face of the outer valve member 34. Moreover, a first channel 52 extends in the upper member from a first inlet 54 arranged in the upper face 42 to a first annular groove part of a first ring groove 56 arranged, on the described embodiment substantially at equidistance between the upper face 42 and the under face 44, to open in said through bore 50 and also, a second channel 58 extends from a second inlet 60 also arranged in the upper face 42 to a second annular groove part of a second ring groove 62 arranged proximal the under face 44 and also opening in said through bore 50 at the level of the top end of the sleeve 46.

In the described embodiment the sleeve member 46 has a constant radial thickness T relatively small in comparison to the axial length L measured from the under face 44 to the distant extremity 48. In an alternative embodiment not represented, the sleeve member have a non-constant radial thickness T slightly decreasing as approaching the distant extremity 48 or, decreasing in steps between sections of constant thickness. A ratio of 8:1 is represented on the figures although another ratio may be chosen. Also, the sleeve member 46 is represented integral to the upper member 30 meaning it is machined within a single metal blank. In an alternative not represented, the sleeve member 46 could be a separate part fixed to the upper member 30 by welding or press-fitting, screwing or any other fixing means. Such non-integral assembly would for instance enable to choose different materials for the sleeve and the upper member.

The tip member 32 of the body has a peripheral wall 64 axially X extending from a large top annular face 66 that complementary engages with the peripheral area of the under face 44 of the upper member, to a narrow tip end 68. The peripheral wall 64 cylindrically extends from said top face 66 forming a large portion 70 of the tip member then, it downwardly narrows via a tapered portion to a cylindrical narrow portion 72 extending to said tip end 68. The peripheral wall 64 defines an inner space S inside the tip member 32, said space S opening at the tip end 68 in an axial cylindrical bore 74 coaxial to the bore 50 arranged in the upper member 30. Right above said bottom bore 74 according to the arbitrary orientation of the figure, are arranged the injection holes of the second set 26, said holes extending through the peripheral wall 64 from the inner space S to the outer face of the wall 64. Adjacent to the entry of the holes 26, in the inner space S, the peripheral wall forms a small sloped face that is part to a second valve seat 76.

As visible on the figures, the sleeve member 46 extends in said inner space S, a portion of the space S outwardly surrounding the sleeve member 46.

The outer valve member 34 is a hollow needle axially extending from an upper end 78 to a tip cylindrical end 80. It is axially guided in the nozzle body 28 between said upper end 78 sliding in the through bore 50 of the upper member 30 and said tip end 80 sliding in the bottom bore 74 of the tip member 32. The outer valve 34 comprises several cylindrical portions, the upper end 78 portion being the largest having substantially the axial length of the upper member 30 from the upper face 42 to the distant extremity 48 of the sleeve and, the tip end 80 being the smallest cylindrical portion of the outer valve member, and being provided with complementary sloped face cooperating in the second valve seat 76. The outer valve member 34 is also provided with an inner axial bore 82 that is sealed at the upper end 78 by the plug 40, said inner bore 82 downwardly extending to the tip end 80 where it narrows in a conical face part of a first valve seat 84, the first set of injection holes 22 being provided right below said first valve seat 84, extending from an entry arranged in a small sac arranged at the very tip of the conical face to an exit arranged on the outside face of the valve member. In the upper cylindrical portion 78, the outer valve member is provided, on its outer face with a first annular groove complementary to the first ring groove 56 and also with a second annular groove complementary to the second ring groove 62. From the first ring groove 56 at least one radial channel 86, not represented, extends through the outer valve member and opens in the upper end of said inner bore 82. Also, from the second ring groove 62 at least one other channel 88, two being represented on the figures, extends through the outer valve member and opens in the inner bore 82 in a position that is substantially aligned to the under face 44 of the upper member.

The inner valve member 36 is a plain needle axially guided in the inner bore 82 of the outer valve member and that axially extends from a head end 90 to a pointy tip end 92 that complementary cooperates with the first valve seat 84. The head end 90 of the needle comprises a male cylindrical portion 94 axially guided in an upper portion of the inner bore 82 of the outer valve member that is arranged between the opening of the channels 86 arriving from the first ring groove and the opening of the channels 88 arriving from the second ring groove. Above said guided portion 94, the inner valve member 36 forms a transverse shoulder face 96 from the center of which an extension member 98 upwardly protrudes in the space that is at the very upper end of the inner bore 82, said space forming a first control chamber 100. The spring 38 is engaged around the extension member 98 and is axially compressed between the shoulder face 96 of the needle and the plug 40, downwardly biasing the needle 36 toward a closed position of the first set of injection holes 22. In addition to be a guiding means, the male cylindrical portion 94 is also a cylindrical seal between the first control chamber 100 and the inner bore 82.

In a non-represented alternative, the sleeve 46 has a smaller inner diameter than the bore 50 and, the outer valve member 34 has complementary diameters larger in the upper section 78 and smaller in the sleeve section 46. This different diameters embodiment helps reducing further fuel leaks between the sleeve and the outer valve member 34.

In use, the first fuel F1 and the second fuel F2 are substantially compressed to similar pressure. The inner valve member 36 slides relative to the outer valve member 34 alternatively opening and closing the first set of injection holes 22 for injecting, or not, the first fuel F1, displacement of the inner valve member 36 being a function of the pressure differential of the first fuel F1 between the first control chamber 100 and the first valve seat 84. Also, the outer valve member 34 slides relative to the body 28 alternatively opening and closing the second set of injection holes 26 for injecting, or not, the second fuel F2. The displacement of the outer valve member 34 is controlled dependent on the pressure of the first fuel F1 in a second control chamber, not shown, and arranged in the actuation assembly 12.

Tests have been made with first fuel F1 being diesel pressurized up to 3000 bars and second fuel F2 being compressed natural gas pressurized to a similar levels. To minimize leakage, the pressure of the first fuel F1 is preferably greater than the pressure of the second fuel F2 by about 10 bars.

In reference to FIG. 4 is explained the pressure balance around the sleeve member 46 that creates the anti-leakage means. When reaching the second ring groove 62 the pressurized first fuel F1 has a tendency to slightly open the functional clearance arranged between the outer valve member 34 and the bore 50 outwardly biasing and enlarging the sleeve member 46, said clearance being necessary to accommodate the sliding displacements, a small leak of said first fuel F1 engaging in said open functional clearance. To balance said influence of the first fuel F1, the second fuel F2, pressurized in the inner S of the body to a similar pressure than the first fuel F1, inwardly biases the sleeve member 46 and tends to close and minimize said functional clearance and thus preventing fuel leaks.

LIST OF REFERENCES

X main axis
F1 first fuel
F2 second fuel
T thickness of the sleeve
L length of the sleeve
S inner space
10 injector
12 actuation assembly
14 nozzle assembly
16 capnut
18 shoulder face
20 first inlet
22 first set of injection holes
24 second inlet
26 second set of injection holes
28 body of the nozzle
30 upper member of the body
32 tip member of the nozzle
34 outer valve member
36 inner valve member—needle
38 spring
40 plug
42 upper face of the upper member of the body
44 under face of the upper member of the body
46 sleeve—anti-leakage feature
48 distant extremity of the sleeve
50 bore
52 first channel
54 first inlet
56 first ring groove
58 second channel
60 second inlet
62 second ring groove
64 peripheral wall
66 annular face
68 tip end of the tip member
70 large portion of the tip end
72 narrow portion of the tip end
74 bottom bore of the body
76 second valve seat
78 upper cylindrical portion of the outer needle
80 tip cylindrical portion of the outer needle
82 axial bore inner to the outer valve
84 first valve seat
86 channel from the first ring groove
88 channel from the second ring groove
90 head end of the inner valve member
92 pointy end of the inner valve member
94 guided portion of the head of the inner valve member
96 shoulder face
98 extension member
100 first control chamber

The invention claimed is:

1. A nozzle assembly of a dual fuel injector of an internal combustion engine, said nozzle assembly extending along a main axis from a large upper end adapted to cooperate with an actuation member of the dual fuel injector to a narrow tip end, said nozzle assembly comprising:

an elongated body coaxially arranged along said main axis and having a peripheral wall surrounding an inner space which portion proximal the larger upper end defines an upper guiding bore for axially guiding an outer valve member arranged therein, said outer valve member being itself provided with an axial bore in which is axially guided an inner valve member;

a first fuel conduit comprising said axial bore and extending from an inlet arranged in a large upper end face of the elongated body to a first set of injection holes arranged in the narrow tip end;

a second fuel conduit comprising said inner space and extending from another inlet arranged in the large upper end face of the elongated body to a second set of injection holes arranged in the narrow tip end; and an anti-leakage feature comprising a cylindrical tubular sleeve axially extending in said inner space from an upper end attached to the elongated body to a distant lower end, the outer valve member being axially guided through said cylindrical tubular sleeve;

wherein a first fuel, flows inside the outer valve member and a second fuel flows in the inner space surrounding said outer valve member;

wherein the cylindrical tubular sleeve is arranged as an extension of the upper guiding bore and wherein a clearance is defined between the outer valve member and the upper guiding bore, or the cylindrical tubular sleeve;

wherein an inner diameter of the cylindrical tubular sleeve is identical to an inner diameter of the upper guiding bore; and wherein said clearance is not constant, the cylindrical tubular sleeve or the outer valve member being provided on at least part of its length with a taper, so that the clearance changes by less than 10 μm.

2. A nozzle assembly of a dual fuel injector of an internal combustion engine, said nozzle assembly extending along a main axis from a large upper end adapted to cooperate with an actuation member of the dual fuel injector to a narrow tip end, said nozzle assembly comprising:

an elongated body coaxially arranged along said main axis and having a peripheral wall surrounding an inner space which portion proximal the larger upper end defines an upper guiding bore for axially guiding an outer valve member arranged therein, said outer valve member being itself provided with an axial bore in which is axially guided an inner valve member;

a first fuel conduit comprising said axial bore and extending from an inlet arranged in a large upper end face of the elongated body to a first set of injection holes arranged in the narrow tip end;

a second fuel conduit comprising said inner space and extending from another inlet arranged in the large upper end face of the elongated body to a second set of injection holes arranged in the narrow tip end; and an anti-leakage feature comprising a cylindrical tubular sleeve axially extending in said inner space from an upper end attached to the elongated body to a distant lower end, the outer valve member being axially guided through said cylindrical tubular sleeve;

wherein a first fuel, flows inside the outer valve member and a second fuel flows in the inner space surrounding said outer valve member;

wherein the cylindrical tubular sleeve is arranged as an extension of the upper guiding bore and wherein a clearance is defined between the outer valve member and the upper guiding bore, or the cylindrical tubular sleeve;

wherein an inner diameter of the cylindrical tubular sleeve is identical to an inner diameter of the upper guiding bore; and wherein said clearance is not constant, the upper guiding bore or the outer valve member being provided on at least part of its length with a taper, so that the clearance changes by less than 10 μm.

3. A nozzle assembly of a dual fuel injector of an internal combustion engine, said nozzle assembly extending along a main axis from a large upper end adapted to cooperate with an actuation member of the dual fuel injector to a narrow tip end, said nozzle assembly comprising:

an elongated body coaxially arranged along said main axis and having a peripheral wall surrounding an inner space which portion proximal the larger upper end defines an upper guiding bore for axially guiding an outer valve member arranged therein, said outer valve member being itself provided with an axial bore in which is axially guided an inner valve member;

a first fuel conduit comprising said axial bore and extending from an inlet arranged in a large upper end face of the elongated body to a first set of injection holes arranged in the narrow tip end;

a second fuel conduit comprising said inner space and extending from another inlet arranged in the large upper end face of the elongated body to a second set of injection holes arranged in the narrow tip end; and an anti-leakage feature comprising a cylindrical tubular sleeve axially extending in said inner space from an upper end attached to the elongated body to a distant lower end, the outer valve member being axially guided through said cylindrical tubular sleeve;

wherein a first fuel, flows inside the outer valve member and a second fuel flows in the inner space surrounding said outer valve member;

wherein the cylindrical tubular sleeve is arranged as an extension of the upper guiding bore and wherein a clearance is defined between the outer valve member and the upper guiding bore, or the cylindrical tubular sleeve;

wherein an inner diameter of the cylindrical tubular sleeve is smaller than an inner diameter of the upper guiding bore; and wherein said clearance is not constant, the cylindrical tubular sleeve or the outer valve member being provided on at least part of its length with a taper, so that the clearance changes by less than 10 μm.

4. A nozzle assembly of a dual fuel injector of an internal combustion engine, said nozzle assembly extending along a main axis from a large upper end adapted to cooperate with an actuation member of the dual fuel injector to a narrow tip end, said nozzle assembly comprising:

an elongated body coaxially arranged along said main axis and having a peripheral wall surrounding an inner space which portion proximal the larger upper end defines an upper guiding bore for axially guiding an outer valve member arranged therein, said outer valve member being itself provided with an axial bore in which is axially guided an inner valve member;

a first fuel conduit comprising said axial bore and extending from an inlet arranged in a large upper end face of the elongated body to a first set of injection holes arranged in the narrow tip end;

a second fuel conduit comprising said inner space and extending from another inlet arranged in the large upper end face of the elongated body to a second set of injection holes arranged in the narrow tip end; and an anti-leakage feature comprising a cylindrical tubular sleeve axially extending in said inner space from an upper end attached to the elongated body to a distant lower end, the outer valve member being axially guided through said cylindrical tubular sleeve;

wherein a first fuel, flows inside the outer valve member and a second fuel flows in the inner space surrounding said outer valve member;

wherein the cylindrical tubular sleeve is arranged as an extension of the upper guiding bore and wherein a clearance is defined between the outer valve member and the upper guiding bore, or the cylindrical tubular sleeve;

wherein an inner diameter of the cylindrical tubular sleeve is smaller than an inner diameter of the upper guiding bore; and wherein said clearance is not constant, the upper guiding bore or the outer valve member being provided on at least part of its length with a taper, so that the clearance changes by less than 10 µm.

5. A nozzle assembly as claimed in claim 1, wherein the cylindrical tubular sleeve is integral to the elongated body.

6. A nozzle assembly as claimed in claim 1, wherein the cylindrical tubular sleeve is a separate member non-integral and fixed to the elongated body.

7. A nozzle assembly as claimed in claim 1, wherein the elongated body comprises an upper member and a tip member, the upper guiding bore being defined in the upper member, the cylindrical tubular sleeve extending from said upper member.

8. A nozzle assembly as claimed in claim 7 wherein the upper member axially extends from the large upper end face wherein are defined inlets to a transverse under face complementary receiving the tip member, the cylindrical tubular sleeve extending from said transverse under face.

9. A nozzle assembly as claimed in claim 1, wherein an axial length of the cylindrical tubular sleeve extending in the inner space is approximately eight times a radial thickness of a tubular wall of the cylindrical tubular sleeve.

10. A dual fuel injector comprising the nozzle assembly as set in claim 1.

* * * * *